United States Patent [19]
Li

[11] Patent Number: 5,920,859
[45] Date of Patent: Jul. 6, 1999

[54] HYPERTEXT DOCUMENT RETRIEVAL SYSTEM AND METHOD

[75] Inventor: Yanhong Li, Scotch Plains, N.J.

[73] Assignee: IDD Enterprises, L.P., New York, N.Y.

[21] Appl. No.: 08/794,425

[22] Filed: Feb. 5, 1997

[51] Int. Cl.⁶ .................................................. G06F 17/30
[52] U.S. Cl. .............................. 707/5; 707/10; 707/501
[58] Field of Search .............................. 707/2, 4, 5, 10, 707/501

[56] References Cited

U.S. PATENT DOCUMENTS

| | | | |
|---|---|---|---|
| 5,408,655 | 4/1995 | Oren et al. | 395/600 |
| 5,418,948 | 5/1995 | Turtle | 395/600 |
| 5,446,891 | 8/1995 | Kaplan et al. | 395/600 |
| 5,488,725 | 1/1996 | Turtle et al. | 707/5 |
| 5,835,905 | 11/1998 | Pirolli et al. | 707/3 |

OTHER PUBLICATIONS

Yuwono et al. "Search and Ranking Algorithms for Locating Resources on the World Wide Web", IEEE, pp. 164–171 1986.
Cheong, Fah–Chun, *Internet Agents: Spiders, Wanderers, Brokers and Bots*, Chapter 4, Oct. 1995.
Croft et al., "A Retrieval Model for Incorporating Hypertext Links," *Hypertext '89 Proceeding*, pp. 213–224, Nov. 1989.
Harman, Donna, "Ranking Algorithms," *Information Retrieval*, Chapter 14, pp. 363–371, 1992.
Bichteler et al., "The Combined Use of Bibliographic Coupling and Cocitation for Document Retrieval," *Journal of the American Society for Information Science*, pp. 278–282 (Jul. 1980).
Dunlop et al., "Hypermedia and Free Text Retrieval," *Information Processing & Managment*, vol. 29, No. 3, pp. 287–298 (1993).
Frei et al., "The Use of Semantic Links in Hypertext Information Retrieval," *Information Processing & Management*, vol. 31, No. 1, pp. 1–13 (1995).

*Primary Examiner*—Thomas G. Black
*Assistant Examiner*—John C. Loomis
*Attorney, Agent, or Firm*—Marshall, O'Toole, Gerstein, Murray & Borun

[57] ABSTRACT

A search engine for retrieving documents pertinent to a query indexes documents in accordance with hyperlinks pointing to those documents. The indexer traverses the hypertext database and finds hypertext information including the address of the document the hyperlinks point to and the anchor text of each hyperlink. The information is stored in an inverted index file, which may also be used to calculate document link vectors for each hyperlink pointing to a particular document. When a query is entered, the search engine finds all document vectors for documents having the query terms in their anchor text. A query vector is also calculated, and the dot product of the query vector and each document link vector is calculated. The dot products relating to a particular document are summed to determine the relevance ranking for each document.

25 Claims, 6 Drawing Sheets

Doc. A

Doc. B

Doc. C

Doc. D

HYPERTEXT DOCUMENT RETRIEVAL SYSTEM AND METHOD

FIELD OF INVENTION

The present invention relates to hypertext document retrieval, and more particularly to systems and methods of searching databases distributed over wide-area networks such as the World Wide Web.

BACKGROUND OF THE ART

A hypertext is a database system which provides a unique and non-sequential method of accessing information using nodes and links. Nodes, i.e. documents or files, contain text, graphics, audio, video, animation, images, etc. while links connect the nodes or documents to other nodes or documents. The most popular hypertext or hypermedia system is the World Wide Web, which links various nodes or documents together using hyperlinks, thereby allowing the non-linear organization of text on the web.

A hyperlink is a relationship between two anchors, called the head and the tail of the hyperlink. The head anchor is the destination node or document and the tail anchor is the document or node from which the link begins. On the web, hyperlinks are generally identified by underscoring or highlighting certain text or graphics in a tail anchor document. When a user reviewing the tail document "clicks on" the highlighted or "anchor-text" material, the hyperlink automatically connects the user's computer with or "points to" the head anchor document for that particular hyperlink.

A hypertext system generally works well when a user has already found a tail document pertaining to the subject matter of interest to that user. The hyperlinks in the tail document are created by the author of the document who generally will have reviewed the material in the head documents of the hyperlinks. Thus, a user clicking on a hyperlink has a high degree of certainty that the material in the head document has some pertinence to the anchor text in the tail document of the hyperlink.

As the popularity of the Internet and the Web has grown, the ability to find relevant documents has become increasingly difficult. If a user is unable to find a first document pertaining to the subject matter of interest, the user will of course not be able to use hyperlinks to find additional pertinent documents. Moreover, the location of a single relevant document may not lead to other documents if the author of the relevant document has not created hyperlinks to other relevant web sites. The proliferation of information has, therefore, lead to the development of various search engines which assist users in finding information. Numerous search engines such as Excite, Infoseek, and Yahoo! are now available to users of the Web.

Search engines usually take a user query as input and attempt to find documents related to that query. Queries are usually in the form of several words which describe the subject matter of interest to the user. Most search engines operate by comparing the query to an index of a document collection in order to determine if the content of one or more of those documents matches the query. Since most casual users of search engines do not want to type in long, specific queries and tend to search on popular topics, there may be thousands of documents that are at least tangentially related to the query. When a search engine has indexed a large document collection, such as the Web, it is particularly likely that a very large number of documents will be found that have some relevance to the query. Most search engines, therefore, output a list of documents to the user where the documents are ranked by their degree of pertinence to the query and/or where documents having a relatively low pertinence are not identified to the user. Thus, the way in which a search engine determines the relevance ranking is extremely important in order to limit the number of documents a user must review to satisfy that user's information needs.

Almost all ranking techniques of search engines depend on the frequency of query terms in a given document. When other related factors are the same, the higher a term's frequency in a given document, the higher the relevance score of this document to a query including that term. Factors other than term frequency, such as such document frequency, i.e. how many documents contain the term, may also be taken into account in determining a relevance score. Once the various factors such as term frequency or document frequency have been determined for a particular query, various models such as the vector space model, probabilistic model, fuzzy logic models, etc. are used to develop a numerical relevance ranking. See, Harman, D., "Ranking Algorithms," Chapter 14, *Information Retrieval*, (Prentice Hall, 1992).

For instance, in the vector space model, a user query Q is represented as a vector where each query term (qt) is represented as a dimension of a query vector.

$$Q=<qt_1, qt_2, \ldots, qt_m>$$

Documents in the database are also represented by vectors with each term or key word (dt) in the document represented as a dimension in the vector.

$$D=<dt_1, dt_2, \ldots, dt_n>$$

The relevance score is then calculated as the dot product of Q and D.

The calculation of the value of each dimension for vectors Q or D may be weighted in a variety of ways. The most popular term-weighting formula is:

$$\text{Weight }(t)=TF*IDF_t$$

where TF is the term frequency of a given term in a document or query, and $IDF_t$ is the inverse document frequency of the term. The inverse document frequency is the inversion of how many documents in the whole document collection contain the term, i.e.:

$$IDF_t = \frac{1}{DF_t}$$

Using an inverse document frequency insures that junk words such as "the," "of," "as," etc. do not have a high weight. In addition, when a query uses multiple terms, and one of those terms appears in many documents, using an IDF weighting gives a lower ranking to documents containing that term, and a higher ranking to document containing other terms in the query.

There are normalized versions of term weighting, which take into account the length of a document including a particular term. The assumption made is that the more frequently a term appears in a document for a given amount of text, the more likely that document is relevant to a query including that term. That assumption may not be true, however, in many cases. For example, if the query is "Java tutorial," a document (call it J), which contains 100 lines with each line consisting of just the phrase "Java tutorial," would get a very high relevance score and would be output by a search engine as one of the most relevant documents to the user. That document, however, would be useless to the user since it provides no information about a "Java tutorial." What the user really needs is a good tutorial for the Java programming language such as found on Sun's Java tutorial site (http://Java.sun.com/tutorial). Unfortunately, the phrase "Java tutorial" does not occur 100 times on Sun's site, and therefore most search engines would incorrectly find Sun's site to be less pertinent, and thus have a lower relevance ranking, than Document J.

Documents such as Document J might not be included in a traditional database because each document in a traditional database is selected or authored for its content rather than the repetition of certain key words. On the Web, where anyone can be a publisher, there is no one to select or screen out document such as J. In fact, some people intentionally draft their documents so that the documents will be retrieved on the top of a ranked list output by search engines that take into account term frequency or normalized term frequency. For instance, a Web site may be designed so that the text for the first five lines includes the work "sex." The Web site may be of low quality or have nothing to do with sex, but a search engine can be fooled into ranking the site highly because of the high frequency of the word "sex" in the site.

Length normalization may also have other problems in a hypertext environment. Documents containing media other than text may make it difficult to accurately calculate the relevant length of a document.

Traditional search engines using key words also may not retrieve relevant documents containing synonyms of those key words. Thus, many search engines may need an extensive thesaurus, which may be too expensive or difficult to build, in order to find a document containing the word "attorney" when the user includes only the word "lawyer" in a query. Traditional search engines also cannot find relevant documents which are in a language other than the language of the query entered by the search engine user. Translation tools are a possible solution, but they may be difficult and expensive to build.

In addition, traditional search engines may be unable to identify non-textual material which is relevant to a query. For instance, a Web site containing pictures of Mozart or examples of Mozart's music may not be deemed relevant by a search engine when that search engine can only search for the word "Mozart" within the text of documents.

SUMMARY OF THE INVENTION

A method of indexing documents includes obtaining a list of hyperlinks pointing to each document, where each hyperlink includes one or more terms. Each document is indexed with the terms in the hyperlink pointing to that document. A number of hyperlinks, each containing a particular term, may point to a document. The number of hyperlinks containing that particular term pointing to the document is indexed with that document.

A particular term may appear in hyperlinks pointing to a number of documents, and the number of documents having the particular term in hyperlinks pointing to those documents is indexed with that term. Indexing may include creating a file listing each term, the number of documents having that term in hyperlinks pointing to those documents, a document identifier for each document having that term in hyperlinks pointing that document, and the number of hyperlinks containing that term pointing to each identified document.

The number of documents having a particular term in hyperlinks pointing to those documents may be indexed with a document identifier for each document having the particular term in a hyperlink pointing to that document. The indexing of a particular term in a hyperlink pointing to a document may be with the inverse of the number of documents having the particular term in hyperlinks pointing to those documents.

A term may appear a number of times in a hyperlink pointing to a document, and the number of times each term appears in a hyperlink is indexed with the document pointed to by the hyperlink.

The terms may be stemmed words. The method of the present invention may be performed on an apparatus and may be stored as a computer-readable set of instructions.

In accordance with another aspect of the present invention, a method of ranking documents is based on the document's relevance to a query where the query has at least one term, and where hyperlinks contain terms and point to corresponding documents. The method includes comparing the words in the query to the words in a hyperlink to obtain a relevance ranking for each hyperlink, and summing the relevance rankings for each hyperlink pointing to a particular document to obtain a summed relevance score for that document.

The query may be represented by a query vector where the query vector contains a dimension for each term in the query. Each document may be represented by document link vectors for each hyperlink pointing to the document, where each document link vector contains a dimension for each term in the corresponding hyperlink pointing to that document. Comparing the words in the query to the words in the hyperlinks includes calculating the dot product of the query vector with the document link vector for that hyperlink. Summing the relevance ranking for each hyperlink pointing to a document includes summing the dot products obtained using the document link vectors for a particular document to obtain the summed relevance score for that document. The summed relevance scores may then be compared to obtain a ranking of documents.

The dimension for a term in a query vector may be related to the inverse of the number of documents having a respective hyperlink containing that term pointing to those documents. Similarly, the dimension for a term in a document link vector may be related to the inverse of a number of documents having a respective hyperlink containing that term pointing to those documents.

Other features and advantages are inherent in the hypertext document retrieval system and method claimed and disclosed or will become apparent to those skilled in the art from the following detailed description in conjunction with the accompanying drawings.

DETAILED DESCRIPTION OF THE PREFERRED EMBODIMENT

Figure 1:
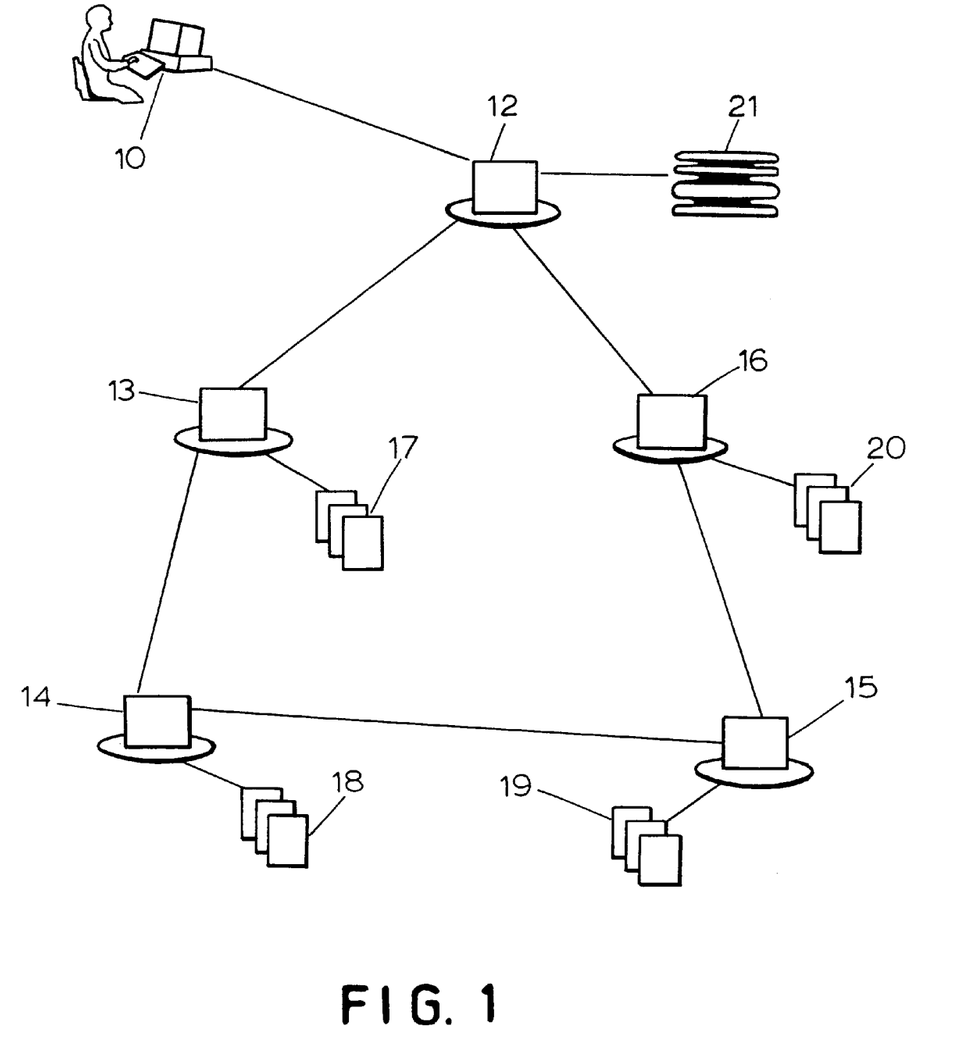
FIG. 1 is a block diagram of a distributed computer network including a hypertext retrieval system of the present invention.

FIG. 1 is a block diagram of a typical distributed hypertext system including a client computer 10 connected to server computers 12, 13, 14, 15, and 16. Although the client computer 10 is shown connected directly to server 12, it may be connected indirectly to server 12 through a service provider or through any one or more of the other servers. Servers 13, 14, 15, and 16 include files of documents 17, 18, 19, and 20, respectively. Files 17, 18, 19, and 20 contain documents available to users of the network. Server 12 includes an index file 21 as discussed in more detail below. The server computer 12 traverses the network looking for all hypertext documents residing in the files 17–20 of the other server computers 13–16 in order to build the index file 21.

Figure 2:
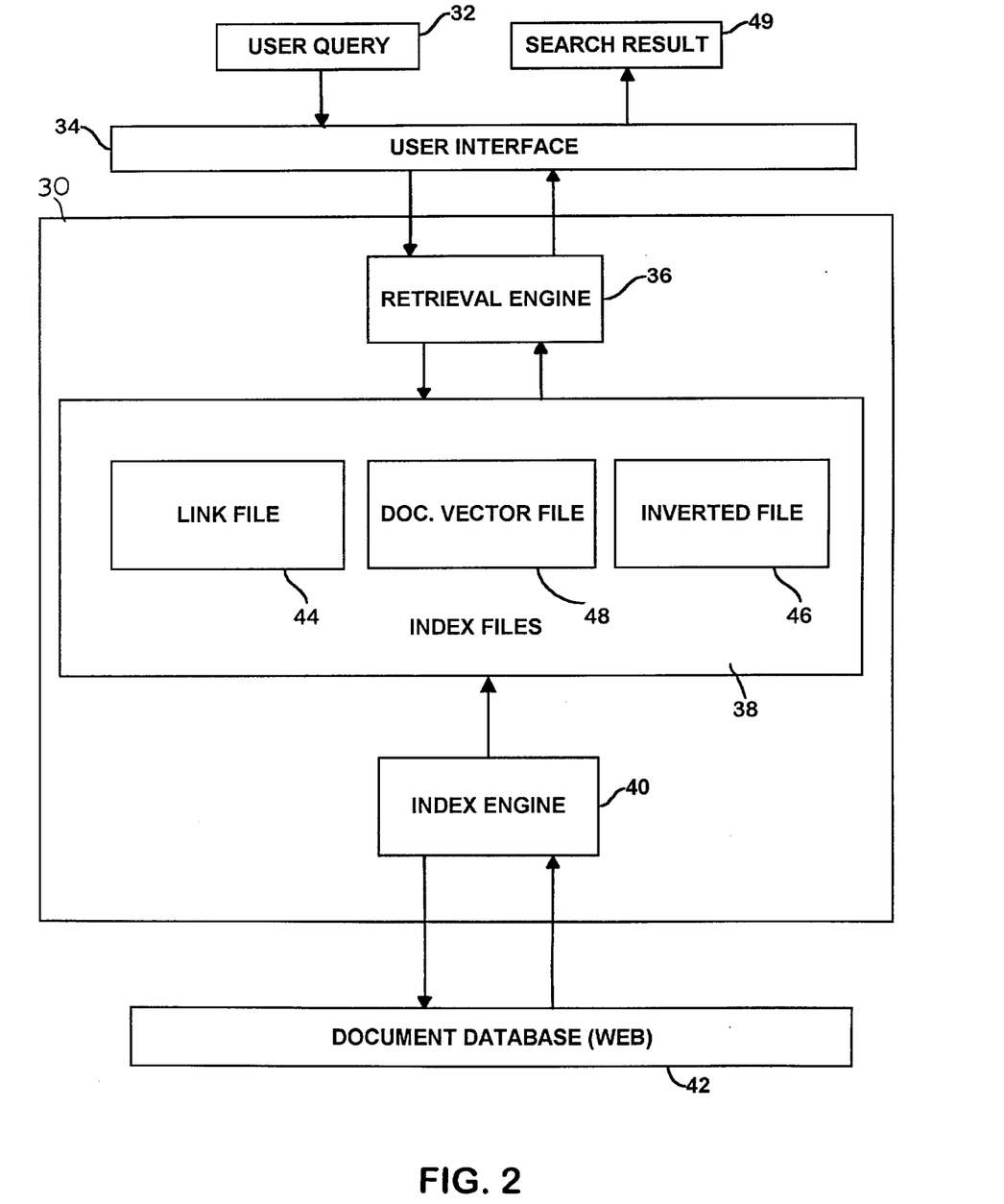
FIG. 2 is a block diagram of an indexing and retrieval system of the present invention.

FIG. 2 describes the general structure of an indexing and retrieval system 30 of the present invention. A user from outside the system 30 inputs a query 32 through a user interface 34, which will typically reside on the user's computer, such as a client computer 10 (FIG. 1). The user's query is then transmitted through the network to the indexing and retrieval system 30, which generally resides on a server, such as server 12 (FIG. 1). The system 30 includes a retrieval engine 36, index files 38, and an index engine 40. The operation of the retrieval engine 36 and index engine 40 and the creation of the index files 38 are described below. The index engine 40 creates the index files 38 by traversing a document database 42, such as that found on the World Wide Web. The document database 42 might include files 17–20 (FIG. 1). The index files 38 created by the index engine 40 may take various forms in accordance with the present invention, but may include a link file 44, an inverted file 46, and a document vector file 48, all of which are described in detail below. The retrieval engine 36 uses the index files 38 in order to determine a relevance ranking for the documents, and outputs search results at 49 through the user interface 34.

Figure 3:
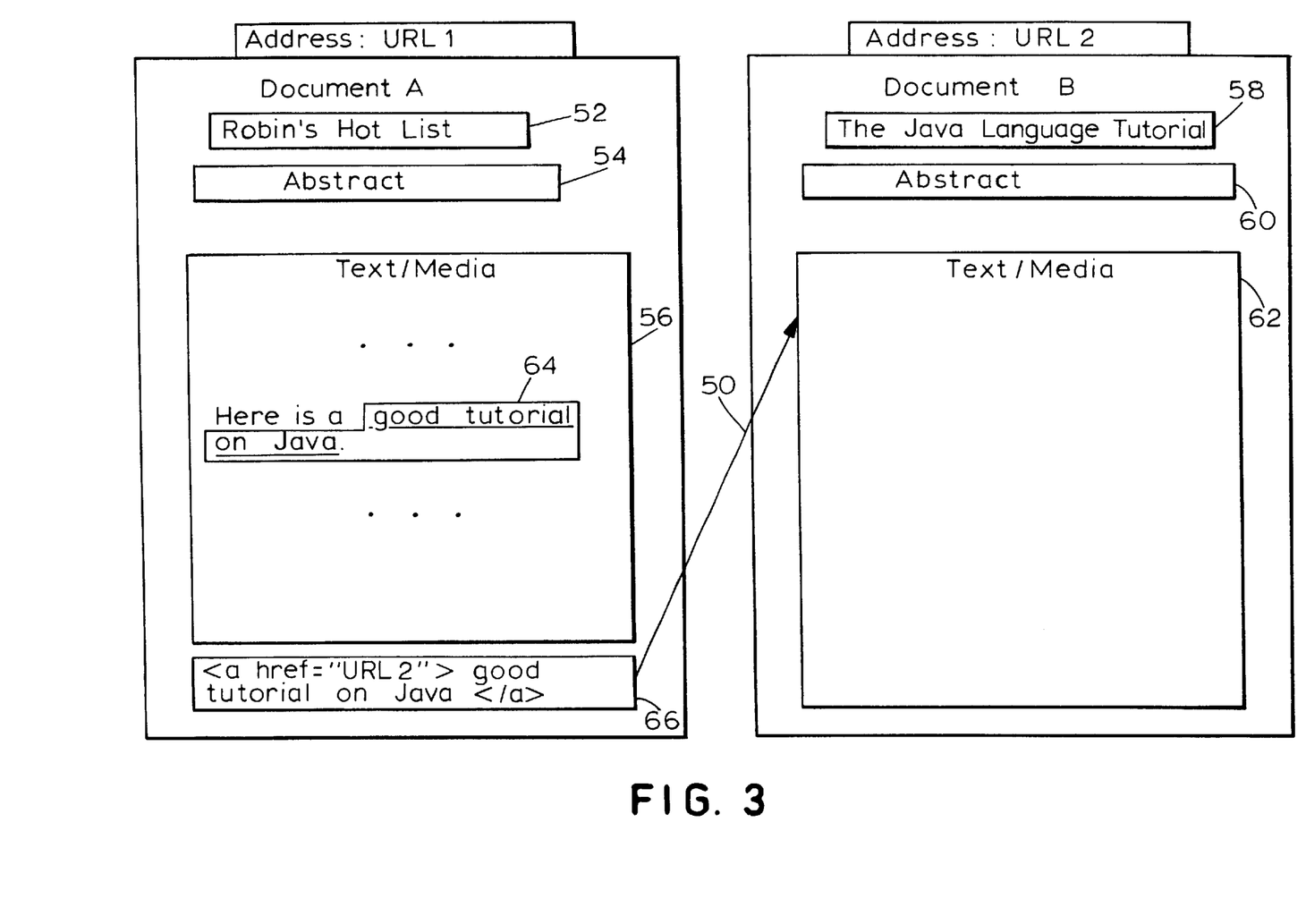
FIG. 3 is a diagram of two hypertext documents.

FIG. 3 is a diagram of Document A and Document B, which are the tail anchor and head anchor, respectively, of the hyperlink represented by the arrow 50. The Document A has an address "URL1" and Document B has an address "URL2." The addresses may be in the form of a uniform resource locator (URL), which is a type of uniform resource identifier (URI) for head and tail anchor addresses. URL's are typically in the format such as:

http://www.w3.org/hypertext/book.html

Optionally, the URL may be followed by the pound symbol and a sequence of characters called a fragment identifier in order to identify a fragment within a document, i.e.:

http://www.w3.org/hypertext/book.html#Chapter1

Document A has a title 52, an abstract 54, and text or media 56. Similarly, Document B has a title 58, an abstract 60, and text or media 62.

The text or media may contain anchor text such as anchor text 64 in Document A. Document A also contains a command 66, which serves as the instructions for the hyperlink 50. The representation of command 66 of the hyperlink 50 is shown in hypertext markup language (HTML) and includes the command "href" and then identifies the address of the head anchor, in this case, the address of Document B "URL2. " The command 66 then includes the statement "good tutorial on Java," which identifies the anchor text of the hyperlink 50. By identifying the phrase "good tutorial on Java" as the anchor text in the command 66, that phrase is thereby underlined in the text 56 of Document A. When text such as anchor text 64 is underlined, it alerts a reader of Document A to the existence of the hyperlink. When a user then clicks on the anchor text 64, the command 66 points to Document B, thereby instructing the user's computer to send a message to the address URL2, requesting a copy of Document B.

The author of Document A must, of course, create the command 66 and identify the anchor text 64. Generally, authors of such documents will describe, in that author's opinion, the head anchor document (in this case Document B) with the words of the anchor text (in this case, anchor text 64). Therefore, if there are many authors like the author of Document A that make link commands to document B using the anchor text 64, then a user looking for a Java tutorial is highly likely to be interested in the information in Document B.

Figure 4:
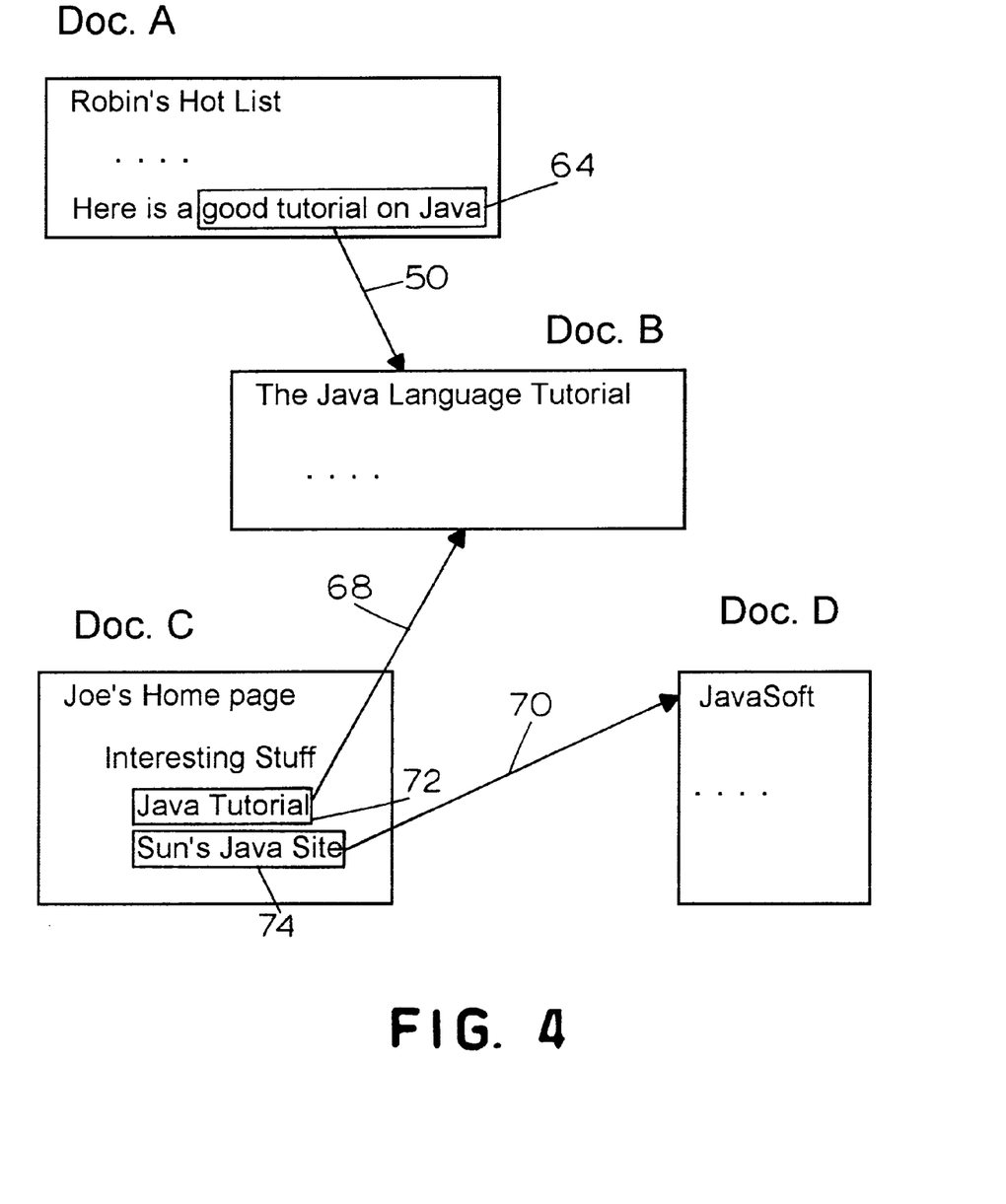
FIG. 4 is an example of a hypertext document system including representation of hyperlinks between those documents.

FIG. 4 is a representation of a simple hypertext system having only four documents, Documents A, B, C, and D. The system shown in FIG. 4 has only three hyperlinks, hyperlink 50, also shown in FIG. 3, and hyperlinks 68 and 70. The anchor text "good tutorial on Java" in Document A is the tail for the hyperlink from Document A to Document B, as shown in FIG. 3. Document C contains two sets of anchor text "Java tutorial" and "Sun's Java site." The anchor text 72 in Document C points to Document B through the hyperlink 68. The anchor text 74 points to Document D through the hyperlink 70. The hypertext system shown in FIG. 4 will be used below in describing the hypertext system including the index engine, the retrieval engine, and the index files created by the index engine.

Figure 5:
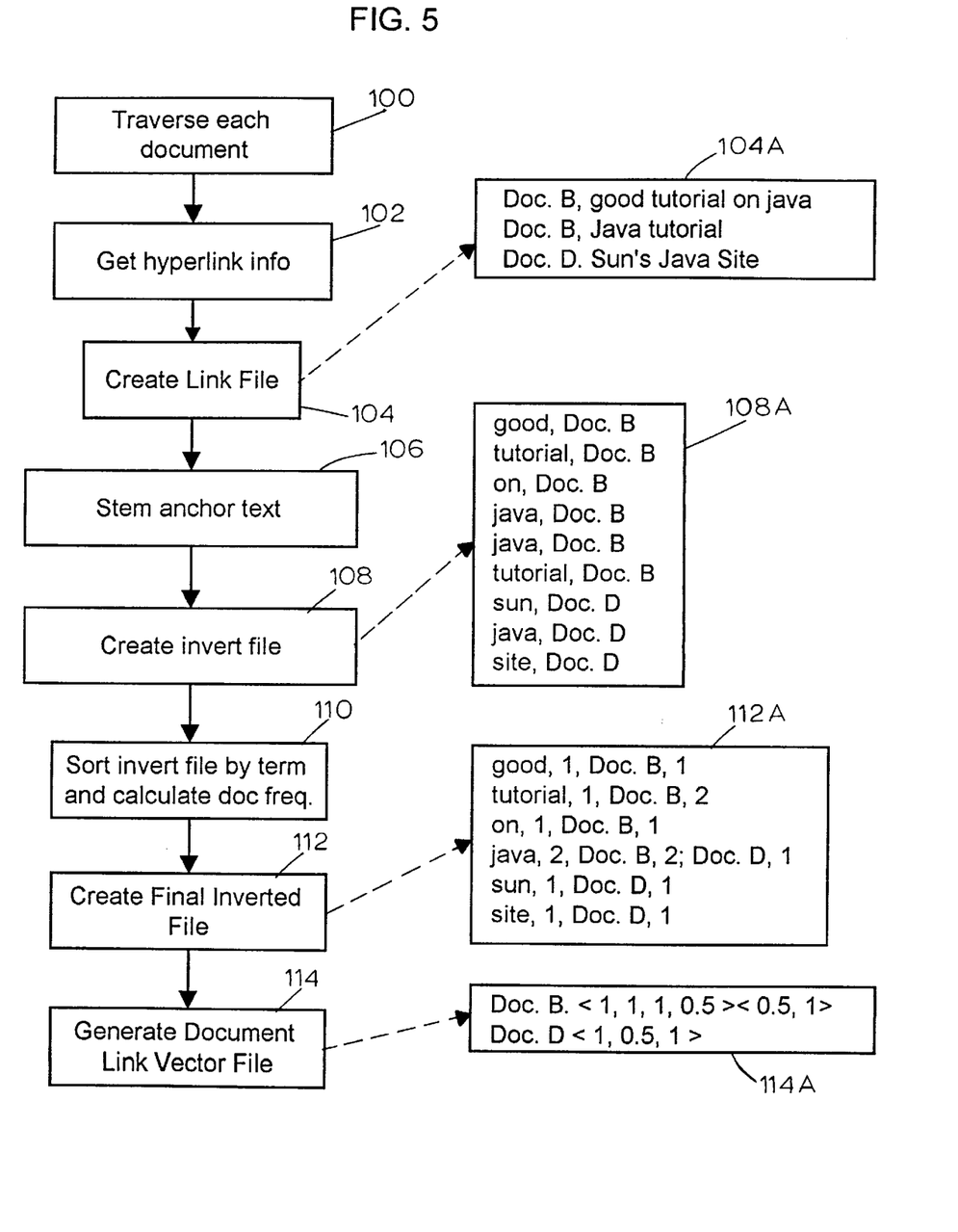
FIG. 5 is a flow chart of an indexing process of the present invention.

FIG. 5 describes the operation of the index engine 40 of FIG. 2. At block 100, the index engine traverses each document in the database. Traversing the database can be accomplished in a variety of ways, but usually using a so-called "spider" program. See, Cheong, F.C. *Internet Agents. Spiders, Wanderers, Brokers, and Bots*, (McMillan, 1997). Spider programs begin by obtaining various URL addresses and send messages to those addresses requesting the documents located at the addresses. Those addresses may identify a server, a document stored in files on that server, or groups of documents. Upon obtaining the document or documents identified by the URL, a spider program then reviews those documents looking for hyperlink commands identifying additional addresses. The spider program records those addresses and then seeks the documents residing at those addresses.

While traversing each document in block 100, the system also obtains hyperlink information at block 102 regarding each document. Such hyperlink information might include the URL of the document, the words in the anchor text of the hyperlink in the document, and the URL of any document pointed to by a hyperlink having that anchor text. The system may also collect a variety of information about the document including its title and possibly the text of the document. The system may also create an abstract, if desired.

At block 104, the system creates one or more link files where entries in the files have a format:

<doc.ID, anchor-text> where doc.ID is an identifier for each head document of a hyperlink having the corresponding anchor text. The doc.ID may be in the form of a URL or may be another identifier which is indexed in some manner with the document's URL. Box 104A is an example of a link file, as referred to in FIG. 2, created for the database of the documents shown in FIG. 4. Since the database in FIG. 4 has three hyperlinks, there are three entries in file 104A. The system may also store the number of times a term appears in anchor text for a particular link. In the examples shown, each term only appears once in a particular link.

Although FIG. 5 shows that traversing of documents in block 100 occurs before link files are created at block 104, it is possible for some link files to be created prior finishing traversing all documents in the database. In fact, once the database has been entirely traversed, it may be desirable to update the link files and other index files by retraversing documents in order to determine if any additional documents have been added to the database, or if any hyperlinks have been added to the documents.

At block 106, the anchor text for the various hyperlinks may be stemmed. Stemming is a process of reducing the words from various morphological forms to a simplified stem. During stemming, words are usually made case-insensitive, e.g. "Tutorial" and "tutorial" are considered the same. "Sun's" will stem to "Sun," "documents" will stem to "document," etc.

Control then passes to block 108, which creates an invert file with entries in the format of:

<term, doc.> where term is a word extracted from the anchor text of a hyperlink and doc. is the identifier for the head document of that hyperlink. An invert file as created in block 108 is shown in file 108A. Since the anchor text "good tutorial on Java" has four words, that hyperlink results in four entries in file 108A.

At block 110, the invert file is sorted by term, and the document frequency is calculated. The document frequency is defined as the number of documents having a particular term in anchor text of hyperlinks pointing to those documents. For instance, in the database of FIG. 4, the term "Java" appears in the anchor text of three hyperlinks, where those three hyperlinks point to a total of two different documents. Therefore, the document frequency for the term "Java" is two. The term "good" appears in only one hyperlink that points to only one document, so the document frequency for the term "good" is one.

Control next passes to block 112, which creates final invert file as shown in 112A. Entries in the final invert file are in the format:

<term, DF, doc1, lf1, doc2, lf2, ... , doci, LFi> where "term" is a term in the anchor text, DF is the document frequency for that term, doci is the document identifier for Document i, and LFi is the link term frequency for doci. Link term frequency is defined as the number of hyperlinks pointing to doci whose anchor text consists of the particular term. For example, the term "good" appears in only one hyperlink that points to Document B, so the link term frequency of the term "good" for Document B is one. The term "Java" appears in two hyperlinks that point to Document B, so the link term frequency of "Java" for Document B is two. One embodiment of the retrieval engine of the present invention will depend on this file to find documents related to a user query.

The index engine at box 114 may also generate a document link vector file where entries in the document link vector file are in the format of:

doc.id, $v_1, v_2, \ldots , v_i$ where doc.id is the identifier for a particular document, and $v_i$ is a vector representation of a hyperlink found in the link file. Each vector $v_i$ will be in the format of:

<$w(t_1), w(t_2), \ldots , w(t_i)$> where $w(t_i)$ is the weight of term i in a given anchor text for the hyperlink represented by the vector. The dimension of each document link vector ($w(t_i)$) is calculated by $TF_i*IDF$, where $TF_i$ is the term frequency of term i, i.e. how many times a term appears in the given anchor text, and IDF is the invert document frequency (1/DF) for the term to which the particular dimension in the link vector pertains. It may be desirable to divide the document frequency by the total number of documents to obtain a normalized document frequency when calculating the dimensions. It may also be desirable to use the logarithm of the inverse document frequency when calculating dimensions.

File 114A is an example of a document link vector file which has been generated at block 114. Since Document B has two hyperlinks pointing to it, there are two vectors for Document B entered in file 114, along with the identifier of Document B. Since the anchor text of the first hyperlink pointing to Document B has four distinct words "good tutorial on Java," the first vector for Document B has four dimensions. Since the second hyperlink pointing to Document B has only two words in the anchor (Java, tutorial), the second vector indexed with Document B has only two dimensions.

As described below, the document link vector file 114A is used in calculating the relevance score with respect to a particular query. Instead of creating document link vector files automatically, it may be desirable to create document link vector files only upon receipt of a query. Thus, the only entries in the link vector files which need to be created are those pertaining to documents having query terms in the anchor text of hyperlinks pointing to those documents.

In the first vector for Document B, the first three dimensions are "one" since the terms "good," "tutorial," and "on" only appear in anchor text pointing to one document, and they only appear once in the anchor text. Thus:

$$TF*IDF=1*1=1.$$

The term "Java," however, has a term frequency of one and document frequency of two, and therefore has an inverse document frequency of 0.5. Thus, TF*IDF for "Java" is 0.5, making the last dimension in the first vector for Document B equal to 0.5. The remaining dimensions in the second vector for Document B and the vector for Document D are also calculated according to the TF*IDF formula.

The link file 104A, the invert file 108A, the final invert file 112A, and the document link vector file 114 are all considered index files as shown in FIG. 2. Although the files as shown in FIG. 5 are preferred, there are many indexing techniques which can be used with a system of the present invention, which rely on anchor text and link frequency in order to index documents. For instance, the files may be compressed or have a variety of relational structures for the data within files or between files.

Figure 6:
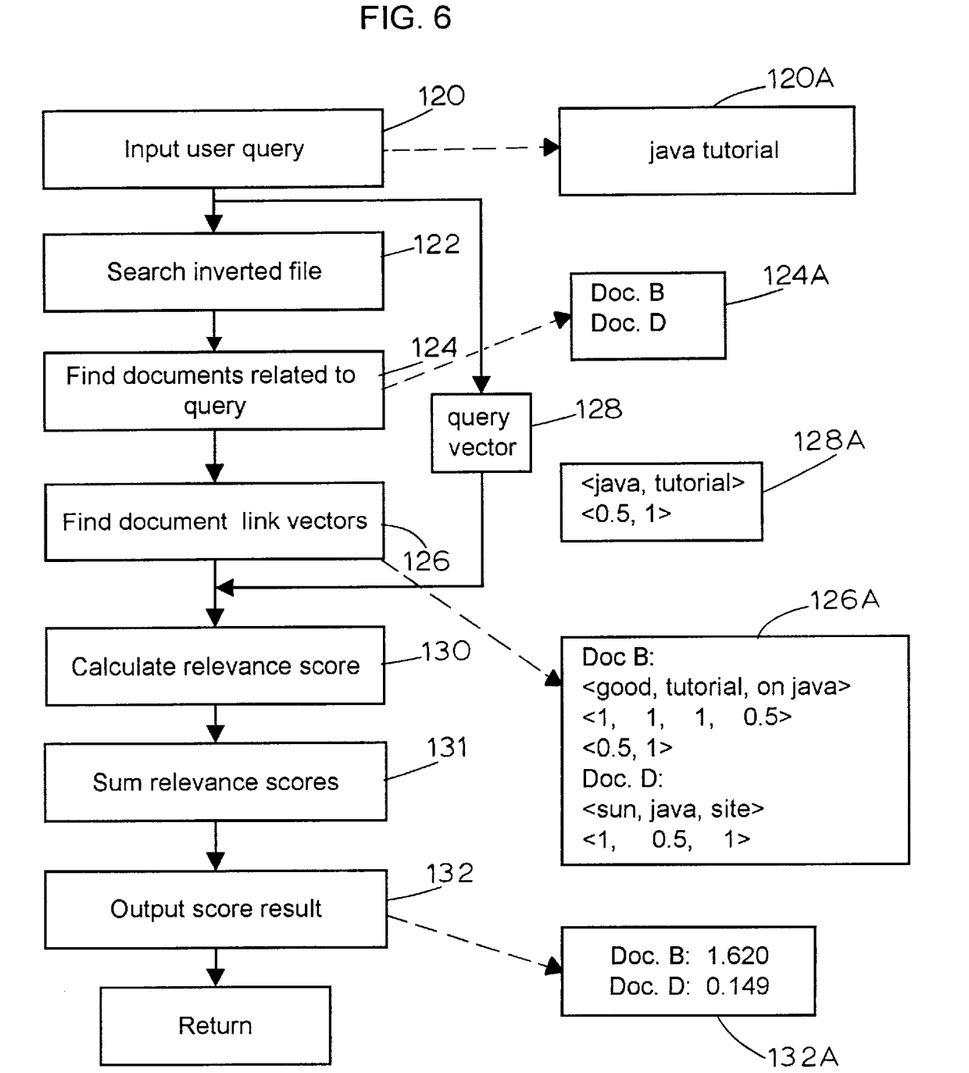
FIG. 6 is a flow chart of a retrieval process of the present invention.

Referring now to FIG. 6, the retrieval process achieves relevance ranking by using the vector space model and link vector voting. The process begins at box 120 with the input of a user query as shown in file 120A. At box 122, the system then searches the inverted file or final inverted file and, at box 124, finds all documents indexed with the query terms. A document may be related to the query if that document has a hyperlink pointing to it, where the hyperlink includes a query term in its anchor text. As shown in box 124A, the system has located two documents, Document B and Document D, each of which has one or more of the terms in the query in anchor text of hyperlinks pointing to those documents.

Control next passes to box 126 where the system finds document link vectors for each document identified in box 124A. The document link vectors are contrasted with conventional document vectors which are based on the content of each document. The system may find the document link vectors by simply going to the document link vector file 114 (FIG. 5) or may create the document link vectors from the invert file and link file. Box 126A shows the document link vectors, along with the anchor text, for each hyperlink pointing to a document related to the query.

While obtaining the document link vectors, the system, at box 128, also creates a query vector as shown in box 128A. The dimensions in the query vector are equal to $TF_q*IDF$ for each term in the query, where $TF_q$ is the term frequency or number of times the term appears in the query. IDF is the inverse document frequency for a term as calculated in box 110 of FIG. 5. The $TF_q$ is one for both "Java" and "tutorial" in the query. The IDF as previously calculated in box 110 of FIG. 5 for "Java" is 0.5 and as calculated for "tutorial" is one.

Once the query vector and all relevant document link vectors have been found or calculated, control passes to block 130 to calculate the relevance scores for each document. The relevance score is calculated by finding the dot product of each document link vector with the query vector. A dot product for vectors <a, b, c> and <d, e, f> is defined as:

$$\frac{a^*d + b^*e + c^*f}{\sqrt{a^2+b^2+c^2}\sqrt{d^2+e^2+f^2}}$$

If two vectors do not have the same dimensions, a zero is entered for each dimension which is not present in that vector. For instance, the first vector for Document B is represented as:

<1, 1, 1, 0.5>.

In such an instance, the query vector would be represented as:

<0, 1, 0, 0.5> so that the dimensions representing "tutorial" in each vector and "Java" in each vector match up. The dot product of the query vector with the first document link vector for Document B would then be calculated as follows:

$$\frac{0 \times 1 + 1 \times 1 + 0 \times 1 + .5 \times .5}{\sqrt{1^2+1^2+1^2+.5^2}\sqrt{1^2+.5^2}} = .620$$

A similar calculation for the second vector for Document B would lead to a dot product of 1.

At box 131, the dot products for all document link vectors pertaining to a particular document are summed to obtain a "vote" or summed score for a particular document. The summed relevance score for Document B is the sum of the dot products for each document link vector relating Document B, which equals 1.620. A similar calculation can be made by finding the dot product of the query vector with the only document link vector for Document D, which equals 0.149.

At box 132, sorted results are output as shown in box 132A. The results are sorted so that the documents having higher summed relevance rankings are listed above those with lower rankings. Instead of listing all documents having a non-zero relevance score, it may be desirable to only list a pre-set number, i.e. the top 100 documents, or to only list those documents having a relevance score above a certain threshold.

The process described herein can be performed on a number of apparatus, including a Sun Sparc Station with a Solaris operating system. The process may be stored in memory on the computer system as a set of instructions. The set of instructions may also be stored on a computer-readable memory such as a disk, and the instructions can be transmitted from one computer to another over a network.

In the example described, no hyperlinks point to Document A or C, so each of their relevance scores is zero, even though both Document A and Document C contain the words in the query, "Java" and "tutorial." A conventional index and retrieval engine could be used in combination with the hyperlinked based index and retrieval system of the present invention. This combination might be used in the case of a link-based relevance score tie, or merely to supplement the link-based information. For instance, suppose the relevance scores for Document A and C are 0.6 and 0.8, respectively, based on conventional and relevance ranking. The final relevance ranking for the query utilizing the conventional ranking to break the tie of the link-based ranking would be Document B, Document D, Document C, and Document A.

Another reason to use combination ranking may be when there are too few hyperlinks (such as only one link) pointing to a document. In such a case, the relevance score based upon the one link may not be accurate, so a threshold can be set for the link-based relevance score. If the link-based relevance score is lower than the threshold, other means of relevance ranking may be used or combined with the link-based relevance score.

Because the index files of the present invention use only hyperlink information, relevance ranking does not depend on the words appearing in documents themselves, or, if used in combination with conventional relevance ranking do not depend solely on words appearing in the documents. Instead, the relevance ranking depends on descriptions of those documents in the anchor text of hyperlinks pointing to the documents. Documents such as Document J described above will not have a high summed relevance score because authors creating hypertext documents will not include hyperlinks in their documents pointing to Document J.

The size of a document is no longer a factor in the relevance ranking, and therefore problems associated with document size can be avoided.

The use of thesauruses may be less important because even if the word "lawyer" never appears in a document titled "California Immigration Attorneys," someone may have created a hyperlink pointing to that document where the anchor text includes the word "lawyer."

Images, graphics, and sounds, which are not searchable by conventional information retrieval methods, are searchable if there are hyperlinks pointing to them. Anchor text may also be in the form of images, graphics, etc. so the index engine may substitute other information such as the tail document's title for the non-textual anchor text.

Documents in a foreign language may also be retrieved if indexing is performed in accordance with the present invention. If documents written in English contain anchor pointing to the foreign-language documents, the foreign-language documents will receive a relevance score in accordance with the present invention.

Thus, when a document database is large enough, as in the case of the World Wide Web, search results are based on a kind of voting, where the description of the content of a document is determined by how others describe the document rather than simply by how the document describes itself. Thus, in the examples shown above, Sun's Java tutorial site will receive a high summed relevance rank even though the term "Java tutorial" appears only once in the document.

The ranking method based on hyperlinks pointing to a given document can be used to select the most popular documents in a specific field using the feature words or description of that field as the query to the system. By analyzing the link file described in the preferred embodiment, and comparing the different descriptions of hyperlinks pointing to the same document, a system can automatically construct a thesaurus or synonym tool.

The foregoing detailed description has been given for clearness of understanding only, and no unnecessary limitations should be understood therefrom, as modifications would be obvious to those skilled in the art.

I claim:

1. A method of indexing documents, the method comprising:
   obtaining a list of hyperlinks pointing to each document, wherein each hyperlink includes one or more terms;
   indexing each document with the terms in the hyperlinks pointing to that document, wherein a number of hyperlinks, each containing a particular term, may point to a document; and
   indexing the number of hyperlinks containing the particular term pointing to the document with that document.

2. The method of claim 1 wherein:
   a particular term may appear in hyperlinks pointing to a number of documents; and
   the number of documents having the particular term in hyperlinks pointing to those documents is indexed with that term.

3. The method of claim 2 wherein the indexing comprises creating a file listing:
   each term;
   the number of documents having that term in hyperlinks pointing to those documents;
   a document identifier for each document having that term in hyperlinks pointing to that document; and
   the number of hyperlinks containing that term pointing to each identified document.

4. The method of claim 1 wherein:
   a particular term may appear in hyperlinks pointing to a number of documents; and
   the number of documents having the particular term in hyperlinks pointing to those documents is indexed with a document identifier for each document having the particular term in a hyperlink pointing to that document.

5. The method of claim 4 wherein each document having a particular term in a hyperlink pointing to that document is indexed with an inverse of the number of documents having the particular term in hyperlinks pointing to those documents.

6. The method of claim 1 wherein:
   a term may appear a number of times in a hyperlink pointing to a document; and
   the number of times each term appears in a hyperlink is indexed with the document pointed to by the hyperlink.

7. The method of claim 1 wherein the terms are stemmed words.

8. An apparatus comprising means for performing the method of claim 1.

9. A computer-readable memory device comprising a set of instructions for performing the method of claim 1.

10. A method of ranking documents based on the document's relevance to a query, wherein the query comprises at least one term, and wherein hyperlinks contain terms and point to corresponding documents, the method comprising:
    comparing the words in the query to the words in a hyperlink to obtain a relevance ranking for each hyperlink; and
    summing the relevance rankings for each hyperlink pointing to a particular document to obtain a summed relevance score for that document.

11. The method of claim 10 wherein:
    a number of hyperlinks, each containing a particular term, may point to a document; and
    the number of hyperlinks containing the particular term pointing to the document is indexed with that document.

12. The method of claim 11 wherein:
    a particular term may appear in hyperlinks pointing to a number of documents; and
    the number of documents having a particular term in hyperlinks pointing to those documents is indexed with that term.

13. The method of claim 12 comprising the creation of a list wherein the list indexes:
    each term;
    the number of documents having hyperlinks pointing to those documents;
    a document identifier for each document; and
    the number of hyperlinks containing that term pointing to each document.

14. The method of claim 10 wherein:
    a particular term may appear in hyperlinks pointing to a number of documents; and
    the number of documents having the particular term in hyperlinks pointing to those documents is indexed with a document identifier for each document having the particular term in a hyperlink pointing to that document.

15. The method of claim 14 wherein each document having a particular term in a hyperlink pointing to that document is indexed with an inverse of the number of documents having the particular term in hyperlinks pointing to those documents.

16. The method of claim 10 wherein:
    a term may appear a number of times in a hyperlink pointing to a document; and
    the number of times each term appears in a hyperlink is indexed with the document pointed to by the hyperlink.

17. The method of claim 10 wherein the terms are stemmed words.

18. The method of claim 10 wherein:
    the query is represented by a query vector wherein the query vector contains a dimension for each term in the query; and
    each document is represented by document link vectors for each hyperlink pointing to the document, wherein each document link vector contains a dimension for each term in the corresponding hyperlink pointing to that document.

19. The method of claim 18 wherein comparing the words in the query to the words in the hyperlink comprises calculating the dot product of the query vector with the document link vector for that hyperlink.

20. The method of claim 19 wherein summing the relevance ranking for each hyperlink pointing to a document comprises summing the dot products obtained using the document link vectors for a particular document to obtain the summed relevance score for that document.

21. The method of claim 20 wherein the summed relevance scores for each document are compared to obtain a ranking of documents.

22. The method of claim 18 wherein the dimension for a term in a query vector is related to the inverse of the number of documents having a respective hyperlink containing that term pointing to those documents.

23. The method of claim 18 wherein the dimension for a term in a document link vector is related to the inverse of the number of documents having a respective hyperlink containing that term pointing to those documents.

24. An apparatus comprising means for performing the method of claim 10.

25. A computer-readable memory device comprising a set of instructions for performing the method of claim 10.

* * * * *